Patented June 17, 1924.

1,497,782

UNITED STATES PATENT OFFICE.

DELPHINE D. GREENE, OF PORT ARTHUR, TEXAS, ASSIGNOR TO THE TEXAS COMPANY, OF NEW YORK, N. Y., A CORPORATION OF TEXAS.

PLASTIC COMPOSITION.

No Drawing.   Application filed April 18, 1921. Serial No. 462,396.

*To all whom it may concern:*

Be it known that I, DELPHINE D. GREENE, a citizen of the United States, and residing in Port Arthur, county of Jefferson, and State of Texas, have invented certain new and useful Improvements in Plastic Compositions, of which the following is a specification.

This invention relates to compositions insoluble in oil and has special reference to the preparation of a material capable of resisting the action of hydrocarbon vapors and gases under high temperatures and pressures.

It is an object of the invention to provide a packing material which is adapted to be placed in the threads and joints of pipes and connections of stills, retorts, and other apparatus in which hydrocarbon oils are being treated.

It is a further object of the invention to provide a packing material that is capable of being readily applied and which will set quickly.

Other objects as well as the particular advantages to be derived from the use of my invention will appear from the following detailed description thereof.

In accordance with my invention a mixture of alcohol, shellac, rosin, gypsum, and iron oxid is prepared, the proportions of ingredients varying somewhat with the particular purpose for which the compound may be intended.

As a specific example of the invention I may state that a mixture suitable for packing material in the joints of stills and pipes employed for the treatment of hydrocarbon oils under high pressures and temperatures may be prepared consisting of the following ingredients:

75 lbs. denatured alcohol,
  75 lbs. orange shellac,
  50 lbs. crushed lump rosin,
   5 lbs. gypsum,
  37 lbs. ferric oxid.

In the preferred manner of preparing this composition the alcohol is placed in a mixing kettle provided with a mechanical stirrer and the shellac and rosin are added gradually while the contents of the kettle are kept in agitation. No heating is ordinarily required. After mixing the composition is preferably allowed to rest for a number of hours after which the gypsum and ferric oxid, which have been mixed intimately together, are added to the compound, being introduced gradually while stirring until a homogeneous mixture of the proper consistency is obtained. The resulting mixture is in a plastic state and upon applying to the joints and threads of pipes quickly sets and forms a seal preventing the escape of vapors or gases even under the most intense temperatures and the highest pressures used in the treatment of hydrocarbon oils.

In addition to forming an excellent packing material the compound of my invention is adapted for use as an anti-rust coating for pipes and other metal ware. It is only necessary to add additional quantities of alcohol or other suitable thinner to render the composition suitable for painting purposes. If desired coloring materials may be added to the mixture in order to prepare a coating compound of suitable color.

It is understood that variations may be made from the particular proportions of ingredients given in the specific example of the invention and that the proportions will vary somewhat with the particular purpose for which the compound is intended. A sealing compound for pressure still apparatus will, however, generally contain approximately 33% by weight alcohol, 30% shellac, 20% rosin, 2% gypsum, and 15% ferric oxid.

What I claim is:—

1. A plastic composition composed of a mixture of approximately 33% by weight alcohol, 30% shellac, 20% rosin, 2% gypsum and 15% iron oxid.

2. A plastic composition composed of alcohol, shellac, rosin, gypsum, and iron oxid mixed to form a plastic mass which readily hardens when exposed to the air in films.

In witness whereof I have hereunto set my hand this 12th day of April 1921.

DELPHINE D. GREENE.